(12) United States Patent
Tabassi

(10) Patent No.: US 7,172,409 B2
(45) Date of Patent: Feb. 6, 2007

(54) INJECTION MOLDING VALVE PIN BUSHING

(75) Inventor: Payman A. Tabassi, Ontario (CA)

(73) Assignee: Mold-Masters Limited, Georgetown (CA)

( * ) Notice: Subject to any disclaimer, the term of this patent is extended or adjusted under 35 U.S.C. 154(b) by 374 days.

(21) Appl. No.: 10/805,382

(22) Filed: Mar. 22, 2004

(65) Prior Publication Data

US 2004/0185138 A1 Sep. 23, 2004

Related U.S. Application Data

(60) Provisional application No. 60/456,247, filed on Mar. 21, 2003, provisional application No. 60/479,908, filed on Jun. 20, 2003.

(51) Int. Cl.
*B29C 45/23* (2006.01)
(52) U.S. Cl. ............... 425/564; 425/566; 425/572
(58) Field of Classification Search .......... 425/562, 425/563, 564, 565, 566, 572
See application file for complete search history.

(56) References Cited

U.S. PATENT DOCUMENTS

| 3,716,318 A | 2/1973 | Erik et al. |
|---|---|---|
| 4,173,448 A | 11/1979 | Rees et al. |
| 4,213,751 A | 7/1980 | Fernandez |
| 4,340,204 A | 7/1982 | Herd |
| 4,433,969 A | 2/1984 | Gellert |
| 4,740,151 A | 4/1988 | Schmidt et al. |
| 5,061,174 A | 10/1991 | Gellert |
| 5,374,182 A | 12/1994 | Gessner |
| 5,378,138 A | 1/1995 | Onuma et al. |
| 5,695,793 A | 12/1997 | Bauer |
| 5,849,343 A | 12/1998 | Gellert et al. |
| 6,079,971 A | 6/2000 | Ramond |
| 6,343,925 B1 | 2/2002 | Jenko |
| 2002/0106419 A1 | 8/2002 | Sattler et al. |

FOREIGN PATENT DOCUMENTS

EP 1223018 7/2002

OTHER PUBLICATIONS

European Search Report for European patent Application No. 04006716 dated Jun. 29, 2004.

*Primary Examiner*—Tim Heitbrink
(74) *Attorney, Agent, or Firm*—Medler Ferro PLLC

(57) ABSTRACT

A valve pin bushing for a valve gated injection molding apparatus having, a back plate, a valve pin bushing, and a manifold, with axially aligned respective valve pin bores. The valve pin bushing includes a back plate contacting surface and an opposite manifold contacting surface for bearing against the back plate and manifold, respectively. The back plate contacting surface has a surface area larger than a surface area of the manifold contacting surface to draw heat from the valve pin bushing to the cooler back plate. An air gap, which may be sealed by an optional sealing portion, is formed where the flange is spaced away from a central portion of the valve pin bushing near the manifold. The valve pin bushing also includes a tubular member for positioning within the manifold valve pin bore, which defines a portion of the manifold melt passageway.

32 Claims, 7 Drawing Sheets

INJECTION MOLDING VALVE PIN BUSHING

RELATED APPLICATIONS

This application is a non-provisional application claiming the benefit under 35 U.S.C. § 119(e) of U.S. Provisional Patent Application No. 60/456,247 filed Mar. 21, 2003 and U.S. Provisional Patent Application No. 60/479,908 filed Jun. 20, 2003.

FIELD OF THE INVENTION

The present invention relates generally to an injection molding apparatus and, in particular, to an improved bushing for a gating valve pin.

BACKGROUND OF INVENTION

A common problem associated with valve gated hot runner injection molding systems is the leaking of molten plastic that can occur between the valve pin and the manifold plate. There are many different valve runner or bushing designs that have attempted to stop leakage from occurring, examples of which can be seen in U.S. Pat. No. 4,740,151 issued Apr. 26, 1988; U.S. Pat. No. 5,696,793 issued Dec. 9, 1997; and U.S. Pat. No. 5,849,343 issued Dec. 15, 1998; and U.S. Patent Application No. US 2002/0106419 A1 published Aug. 8, 2002.

Existing valve pin bushings tend to have a high thermal mass concentrated around the valve pin and the manifold plate by having a larger disk head arranged to bear against a manifold, which can result in a hot area next to the valve pin prone to leakage in some applications. Thus, there remains a need for valve pin bushing that is less prone to leakage and which is economical to produce and use.

SUMMARY OF THE INVENTION

The present invention provides a valve pin bushing having a reduced thermal mass closer to the valve pin and manifold plate in order to reduce leakage. In particular, the valve pin bushing of the present invention draws less heat from the hot manifold than it transfers to the cooler back plate, such that the overall temperature of the valve pin bushing is less than that of the manifold. As such, leaking melt material will become more viscous and/or harden within or near the valve pin bushing rather than leak out from the injection molding apparatus.

According to one aspect of the invention, there is provided an injection molding apparatus that includes a heated manifold having a manifold surface, a back plate having a back plate surface disposed adjacent and parallel to the manifold surface, and a valve pin bushing disposed between the manifold and the back plate. The valve pin bushing including a head portion with a manifold contacting surface and an opposing back plate contacting surface. The back plate contacting surface has a first surface area that is larger than a second surface area of the manifold contacting surface, thus drawing more heat into the back plate than from the manifold to cool the valve pin bushing. The manifold may also have a positioning pin which fits within a positioning groove on the valve pin bushing for correct alignment of the valve pin.

In other aspects of the invention, the valve pin bushing may also include a head portion having a flange and a central portion extending from a back end of the head portion. A lip may extend from the central portion, with another surface contacting the manifold. The central potion may be spaced away from the flange to form an air space between the flange and the central portion near the manifold. For example, the central portion may taper away from the flange, such as having a frusto-conical configuration. Alternatively, the back end may have a surface parallel to the manifold, but not touching it, with the central portion extending from the back end and being spaced away from the flange. The valve pin bushing may include a tubular member extending from the central portion in the same direction as the flange (opposite from the back end) and into a bore in the manifold, which may form part of a melt channel in the manifold, by being curved or angled.

In other aspects of the invention, the valve pin bushing may also include a sealing portion joined to the flange and the tubular member, so that the flange, the sealing portion and the central portion define a closed space. The sealing portion may be separate from the other parts of the valve pin bushing, or it may be formed integrally with either the flange or the tubular member. The closed space may form a vacuum (created by vacuum brazing the parts together) or may be filled with air. The sealing portion may include at least one groove to reduce the surface area in contact with the manifold and to trap leaking melt material. When the back plate contacting surface is circular, then preferably the manifold contacting surface is annular. However, the back plate contacting surface may be a shape other than circular. In another embodiment, the valve pin bushing may have a plurality of flanges extending from the back end of the head portion.

According to another aspect of the invention, there is provided, a valve pin bushing having a head portion and a tubular member, where the tubular member extends from the head portion. The head portion includes a flange and a central portion extending from a back end thereof. The head portion has a back end with a back plate contacting surface. The flange has a manifold contacting surface. The back plate contacting surface has a first surface area that is larger than a second surface area of the manifold contacting surface. The tubular member further extends from the central portion of the head portion in the same direction as the flange (i.e., opposites the back end of the head portion). Further, the head portion and the tubular member define a channel through the valve pin bushing for a valve pin to be inserted.

According to yet another aspect of the invention, there is provided a method for inhibiting leakage of melt material from a valve gated injection molding apparatus. This method includes the step of providing a valve pin bushing having a valve pin channel and a head portion between a manifold and a back plate of an injection molding apparatus, wherein less surface area of the head portion contacts the manifold than the back plate. This method includes lowering the temperature of leaking melt by drawing heat away from the melt and into the back plate through the valve pin bushing until the melt hardens and forms a seal preventing additional melt from leaking from the injection molding apparatus.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Like numerals are used to refer to similar components throughout the Figures.

DETAILED DESCRIPTION OF THE INVENTION

Figure 1A:
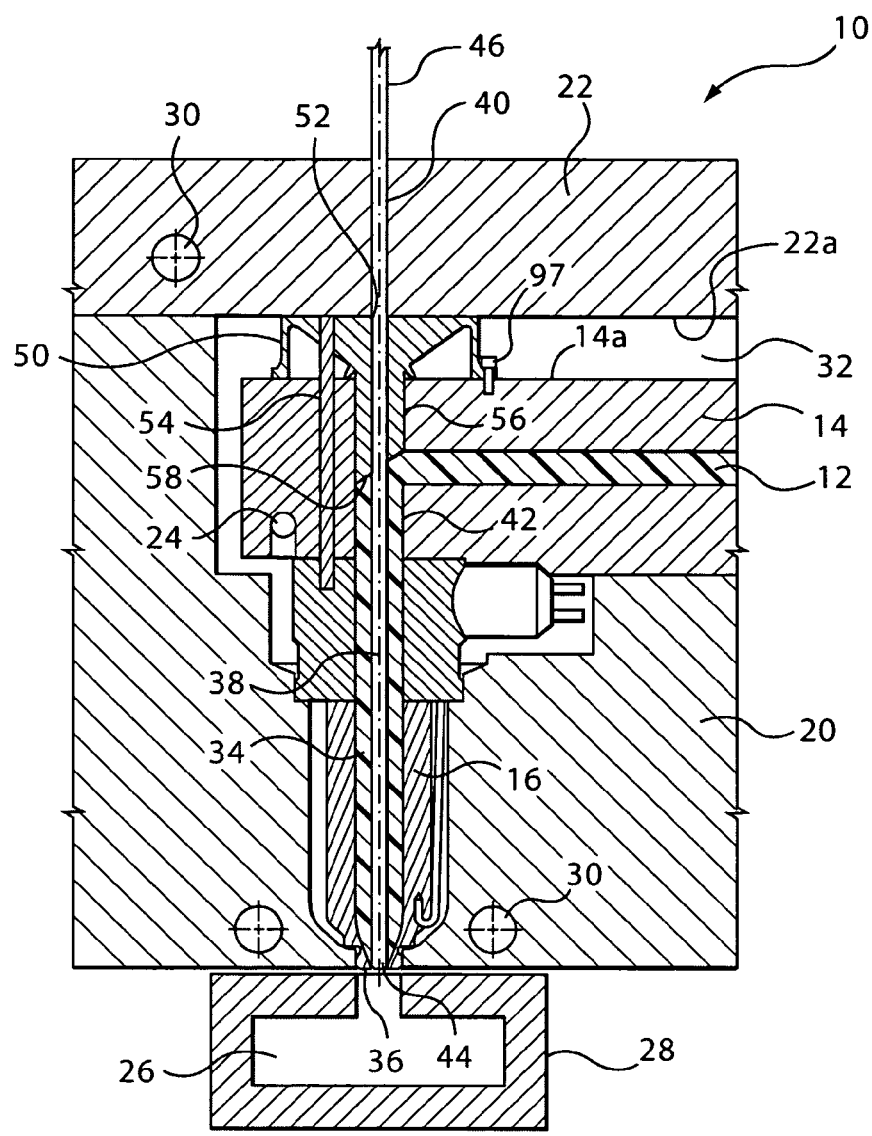
FIG. 1A is a sectional view of a portion of an injection molding system showing a valve pin bushing according to an embodiment of the invention.

FIG. 1A shows a portion of a valve gated injection molding apparatus 10 according to an embodiment of the present invention. The injection molding apparatus 10 includes a melt distribution manifold 14 through which a manifold melt passage 12 extends for flow of a pressurized melt stream of moldable material. The manifold 14 is heated by an integral heater 24. The apparatus 10 includes a nozzle 16 to convey the pressurized melt stream through a central nozzle bore, or nozzle melt passage 34, from the manifold melt passage 12 to a cavity 26 in a mold 28. The nozzle 16 is located in a nozzle well in a cavity plate 20 through which cooling conduits 30 are provided for a cooling fluid such as water. The manifold 14 is located between a back plate 22 and the nozzle 16, with an insulating air space 32 provided between a manifold surface 14a of manifold 14 and a back plate surface 22a of back plate 22. Cooling conduits 30 are also provided through the back plate 22. Although only one nozzle 16 and manifold melt passage 12 is shown in FIG. 1A, the apparatus 10 will typically include a number of such nozzles and melt passages. As can be seen in FIG. 1A, a forward end of the manifold bore 42 forms part of the manifold melt passage 12, and more particularly, it defines an outlet that is substantially transverse to the rest of the manifold melt passage 12.

The nozzle melt passage 34 communicates with the mold cavity 26 through a gate 36. An elongated valve pin 38 extends through axially aligned bores 40 and 42 in the back plate 22 and the manifold 14, respectively, and centrally through the aligned nozzle melt passage 34. As known in the art, the valve pin 38 reciprocates axially within the manifold bore 42 and has a tapered forward end 44 that cooperates with gate 36 for controlling the flow of the melt stream into cavity 26. A pneumatic or other type of actuator (not shown) acts on a back end 46 of the valve pin 38 for reciprocating the pin axially forward and backward between open and closed positions relative to gate 36.

Figure 1B:
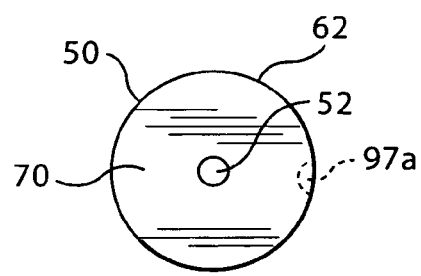
FIG. 1B is a top view of the valve pin bushing of FIG. 1A.

The present invention is directed towards a valve pin bushing 50 that is located in the air space 32 between back plate surface 22a and manifold surface 14a. Valve pin bushing 50 has a central bore 52 that is aligned with back plate bore 40, manifold bore 42 and nozzle melt passage 34, through which the valve pin 38 extends. Bolts 54 may extend through the valve pin bushing 50 and manifold 14 into an upper end of nozzle 16 to secure the nozzle and valve pin bushing 50 in this alignment. Further, manifold 14 may include a locating pin 97 that fits with locating groove 97a (seen in FIG. 1B) in valve pin bushing 50 to ensure proper alignment of bores 42 and 52.

FIGS. 1A, 1B, 2 and 3 show one embodiment of the present invention. In this embodiment, valve pin bushing 50 includes a tubular member 56, through which bore 52 extends. A length of tubular member 56 extends a predetermined distance into a back end of the manifold bore 42. A leading surface 58 of the tubular member 56 may be chamfered or angled and defines part of the manifold melt passage 12.

In one embodiment, valve pin bushing 50 has a head portion 66 with a back end 62. The head portion 66 includes a central portion 57 and an outer support flange 64, which is an annular wall. Flange 64 may be integrally formed with central portion 57 at a back end 62 of head portion 66. In this embodiment, head portion 66 has a frusto-conical shaped central portion 57. A shoulder 68 is provided around a forward end of the support flange 64. Further, flange 64 defines a manifold contacting surface 63 of head portion 66 for bearing against manifold surface 14a of manifold 14. Back end 62 of the head portion 66 defines a circular substantially planar back plate contacting surface 70 for bearing against back plate surface 22a of back plate 22.

The frusto-conical central portion 57 of head portion 66 tapers inwards as the distance from back end 62 increases, such that an air space 72 is defined by an inner surface of the support flange 64, an outer surface of the central portion 57 and manifold surface 14a. Air space 72 increases in area nearer manifold surface 14a.

Figure 3:
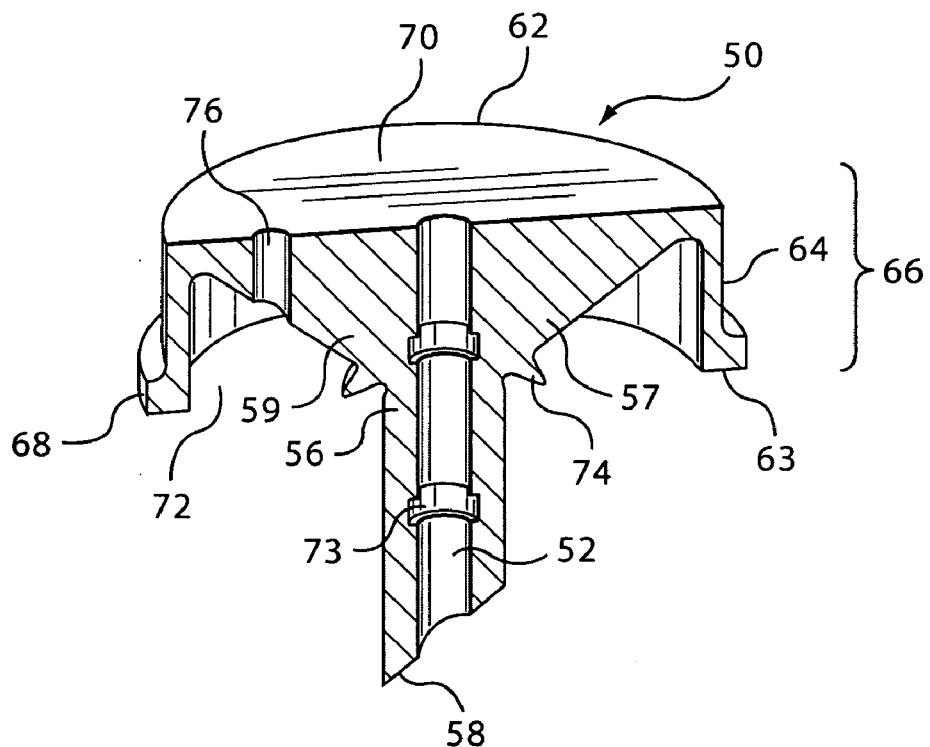
FIG. 3 is a perspective sectional view of the valve pin bushing of FIG. 2.

Central portion 57 of head portion 66 includes a resilient lip 74 for engaging manifold surface 14a near manifold bore 42. As shown in FIGS. 1A and 3, a bolt passage 76 may be provided through the head portion 66 for bolts 54. More than one bolt passage 76 may be provided. As known in the art, rings 73 may be providing along bore 52 to allow venting of gases during operation of the injection molding apparatus.

Valve pin bushing 50 functions as a retaining and sealing bushing for helping to retain the valve pin in central alignment with the gate 36 and to prevent, or reduce the amount of, melt stream material leaking from manifold bore 42. Valve pin bushing 50 also maintains a bearing pressure on manifold 14 to retain its location. Flange 64 of valve pin bushing 50 is configured such that a relatively small surface area of manifold contacting surface 63 of head portion 66 is in contact with hot manifold 14, while at the same time a relatively larger surface area of back plate contacting surface 70 of back end 62 is in contact with the cooler back plate 22. Additionally, the mass of central portion 57 of head portion 66 is less in the vicinity of the manifold 14, where valve pin 38 is at its hottest, and greater near cooler back plate 22.

During operation of the apparatus 10, the air in air space 72 insulates head portion 66 of the valve pin bushing 50 from the heat of manifold 14. The surface area between back plate contacting surface 70 and back plate surface 22a provides a relatively large surface area for heat exchange between valve pin bushing 50 and back plate 22, permitting heat that has been picked up by valve pin bushing 50 through its contact with valve pin 38, leaking melt and manifold 14 to dissipate into back plate 22. Outer support flange 64 and the inner lip 74 are dimensioned and have sufficient spring-like resiliency to permit relative motion between back plate 22 and the manifold 14 due to relative thermal expansion, but at the same time maintain a sealing pressure between back plate 22 and manifold 14.

Valve pin bushing 50 may be a unitary structure formed from steel or other heat conducting metal. Non-limiting examples of possible materials from which valve pin bushing 50 can be made from include, among other things, stainless steel, tooling steel such as H13, and various ceramic materials.

In one embodiment, lip 74 provides a seal to prevent melt stream material that makes its way up the manifold bore 42 outside of tubular member 56 from leaking into air space 72 or further into air space 32. The lip 74 extends outwards and downward from forward end 59 of central portion 57 to engage the surface of manifold 14 around the back end of manifold bore 42. The lip 74 may taper as it extends outward such that only a small area of lip 74 contacts the manifold 14. In another embodiment the lip 74 may be replaced by a sealing ring of the type typically used in high temperature applications.

The seal between the tubular member 56 and the wall of the manifold bore 42 can be enhanced in some applications by melt stream material that works its way up the manifold bore 42 around the outside of tubular member 56 and hardens nearer the cooler side of valve pin bushing 50 closer to back end 62. Further, melt stream material that leaks between the valve pin 38 and the wall of the bore 52 will harden as the temperature of the valve pin bushing 50 cools toward the colder back plate 22. Since the valve pin bushing 50 is designed to limit the contact with the manifold 14 but retain substantial contact with the cooler back plate, heat is pulled faster from the leaking melt towards the back end 62 of the valve pin bushing 50 than from the manifold 14 causing the melt to cool and become more viscous or even harden. By its configuration, the valve pin bushing of the present invention provides a colder contact area around the valve pin and reduces the potential for melt stream leakage.

Figure 4:
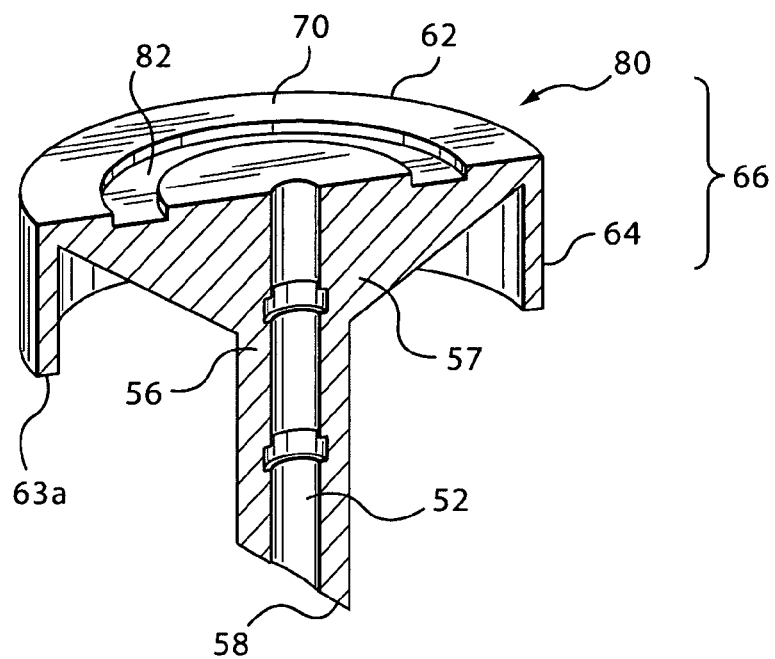
FIG. 4 is perspective sectional view of a valve pin bushing according to a further embodiment of the invention.

In another embodiment, lip 74 may be omitted, and instead valve pin bushing 50 may have a tighter tolerance between the tubular member 56 and the manifold bore 42 in order to prevent leakage. By way of example, FIG. 4 shows a valve pin bushing 80 according to another embodiment of the present invention, which is substantially similar to valve pin bushing 50 except for differences that will be apparent from the Figures and the present description. Unlike valve pin bushing 50, valve pin bushing 80 does not include an inner sealing lip 74 and does not include an enlarged shoulder 68 as part of flange 64, which further reduces the contact surface area of manifold contacting surface 63a.

In another embodiment, back plate contacting surface 70 may be contoured to provide a desired heat transfer profile between the back end 62 of head portion 66 and back plate 22. By way of example, in valve pin bushing 80 of FIG. 4, a groove or recess 82 is provided in back plate contacting surface 70 to reduce the direct surface area between back end 62 and back plate 22, such that less heat will be exchanged between back end 62 and the back plate 22.

In another embodiment, the valve pin bushing may be formed from more than one component, rather than being a unitary structure. For example, back end 62 of a valve pin bushing of the present invention could be formed independently of flange 64, with the two portions connected together by a removable connection, such as a threaded connection, or by a permanent connection, such as brazing, welding, use of an adhesive, or other method apparent to one skilled in the art. Such a configuration facilitates the use of different materials having different thermal and other physical characteristics such that various portions can each be formed from different materials each having the characteristics best suited for the different functions carried out by such portions.

Figure 5:
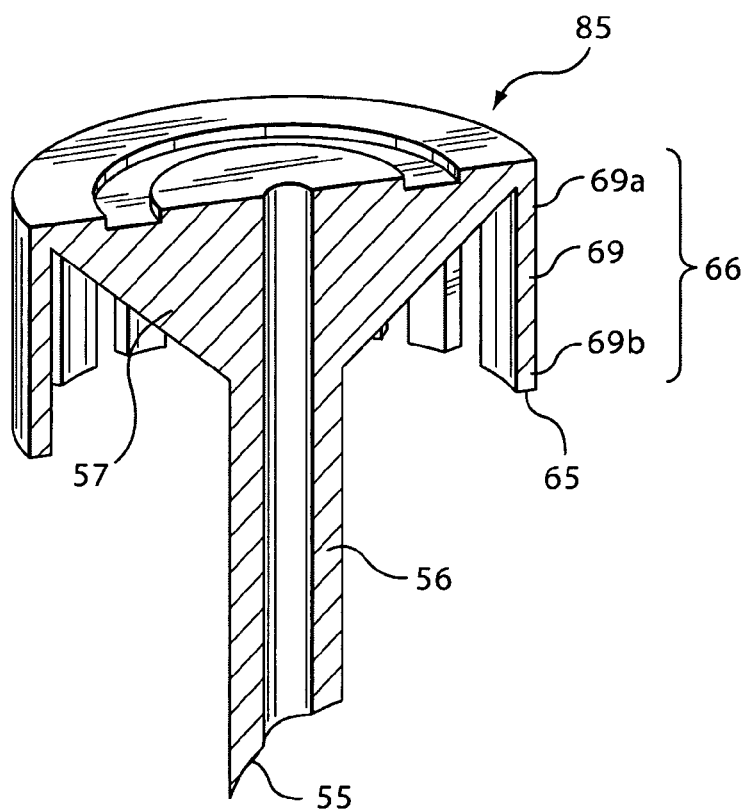
FIG. 5 is a perspective sectional view of a valve pin bushing according to a further embodiment of the invention.

It will be appreciated that a valve pin bushing of the present invention could be modified in a number of ways without departing from the scope of the invention. Flange 64 may include one or more openings or cutouts therein to reduce contact between the manifold contacting surface 63 and the manifold surface 14a, thus reducing heat conduction from the hot manifold 14 to the valve disk 50. For example, FIG. 5 shows a valve pin bushing 85 that is similar to the embodiment shown in FIG. 4 except that rather than flange 64, valve pin bushing 85 includes a plurality of flanges 69, or legs, spaced apart along a perimeter of head portion 66. Each flange 69 has a first end 69a integrally connected to head portion 66 and a second end 69b having a manifold contacting surface 65 that contacts manifold surface 14a of manifold 14. As such, having a plurality of manifold contacting surfaces 65 further reduces the contact surface area between manifold 14 and head portion 66. The embodiment of FIG. 5 may be further modified by the addition of fewer or greater number of flanges 69. Further, flanges 64/69 in a valve pin bushing of the present invention may be modified in other ways as would be apparent to one skilled in the art provided that a contact surface area between flanges 64/69 and manifold 14 is less than a contact surface between back end 62 of a valve pin bushing of the present invention and back plate 22.

The embodiment of FIG. 5 also illustrates that a leading surface 55 of tubular member 56 may be curved rather than angled to proved a substantially rheological bend for the melt stream to flow more smoothly though manifold melt passage 12.

Figure 6:
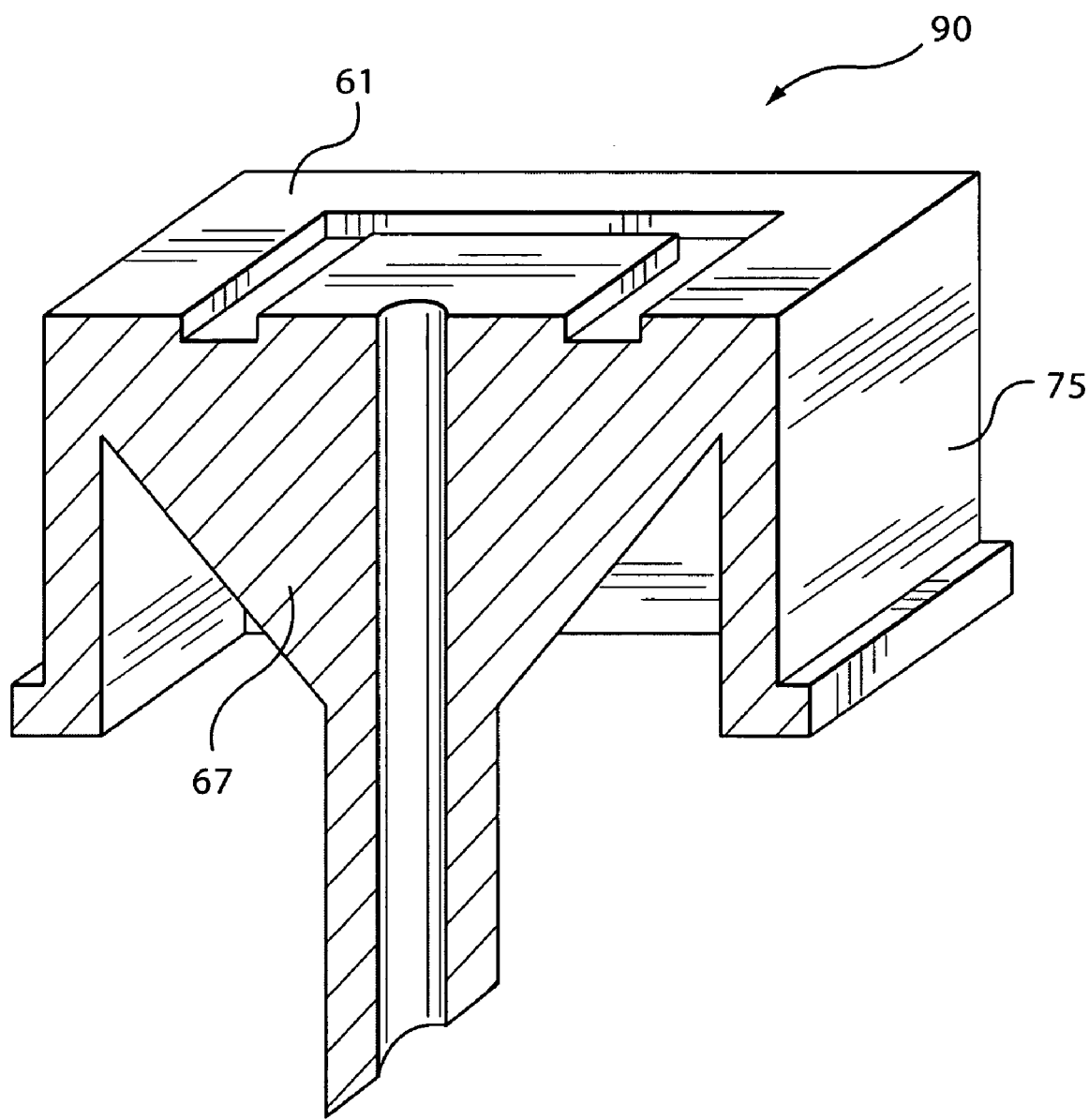
FIG. 6 is a perspective sectional view of a valve pin bushing according to a further embodiment of the invention.

FIG. 6 shows another alternative to the embodiments disclosed above. In particular, FIG. 6 shows a valve pin bushing 90 similar to valve pin bushing 80 of FIG. 4 except that instead of back end 62 being circular, back end 61 of valve pin bushing 90 is square. Flange 75 extends from back end 61 forming a square shaped perimeter. As such, the general shape of the present invention need not be limited to either of the circular or square embodiments, but may be a variety of shapes as would be apparent to one of ordinary skill in the art. Central portion 57 of FIG. 2 may have a configuration other than frusto-conical and still have a mass that decreased towards manifold 14. For example, in FIG. 6, a central portion 67 is a reverse square pyramid shape, rather than a frusto-conical shape. As such, other shapes apparent to one skilled in the art would also be suitable.

Figure 2:
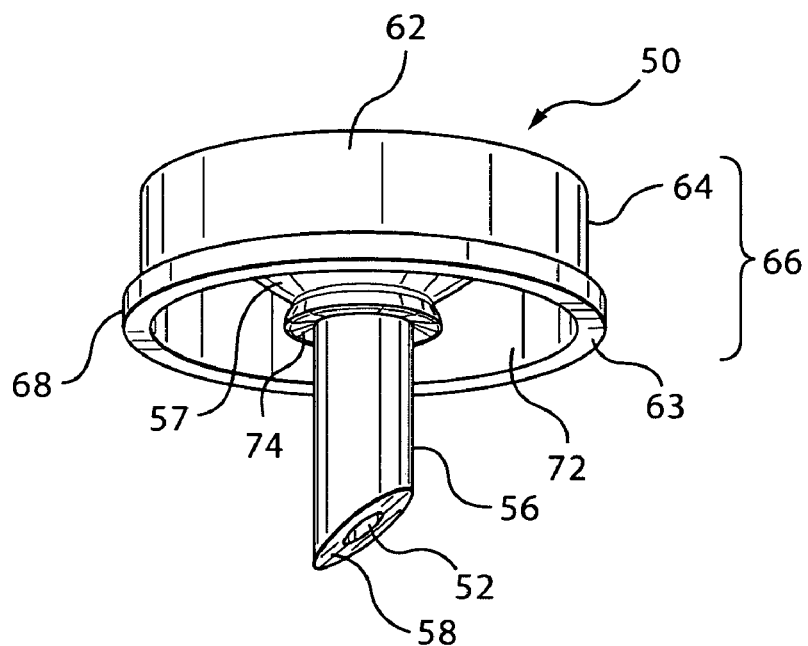
FIG. 2 is a perspective view of a valve pin bushing according to an embodiment of the present invention.
Figure 7:
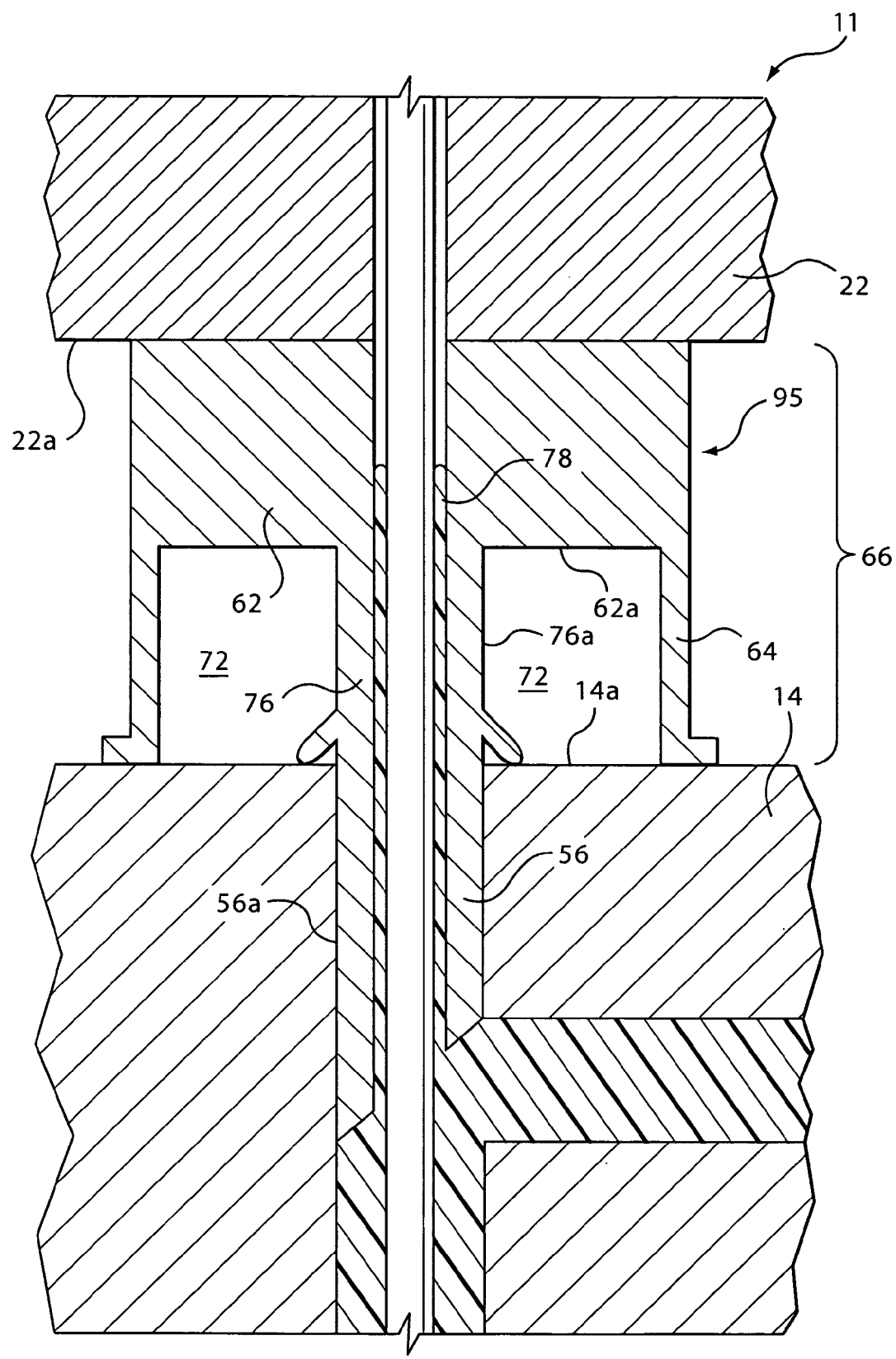
FIG. 7 is a sectional view of a portion of an injection molding apparatus showing a valve pin bushing according to a further embodiment of the invention.

Further, although a tapered central portion, as in central portions 57, 67 of FIGS. 2 and 6, is preferred because heat will be drawn toward the area of the valve pin bushing having the larger mass to equalize the heat transfer within the valve pin bushing, other embodiment will function similarly to the preferred embodiment. For example, FIG. 7 shows an injection molding apparatus 11 similar to that of FIG. 1, except that the valve pin bushing 95 positioned between back plate 22 and manifold 14 does not have a tapered central portion 76. Instead, head portion 66 has a thicker back end 62, which has a generally flat outer surface 62a, which is parallel to but not contacting manifold surface 14a. Central portion 76 extends from back end 62, such that it has an outer surface 76a which is perpendicular to outer surface 62a of back end 62. As such, an air space 72 is defined by flange 64, back end 62, central portion 76 and manifold 14. In the example shown in FIG. 7, central portion 76 has a similar cross-sectional diameter as tubular member 56, however central portion 76 may have several different cross-sectional shapes.

Valve pin bushing 95 works substantially the same as the other valve pin bushings of the present invention. Heat is absorbed from the manifold 14 and transferred to the colder back plate 22 at a faster rate than it is absorbed because the contact surface area between the manifold 14 and flange 64 is less than the contact surface area between back end 62 of head portion 66 and back plate 22. As such, valve pin bushing 95 cools to a temperature lower than manifold 14, causing leaking melt stream 78 to become more viscous or to harden forming a seal to avoid leaking melt material.

Figure 8:
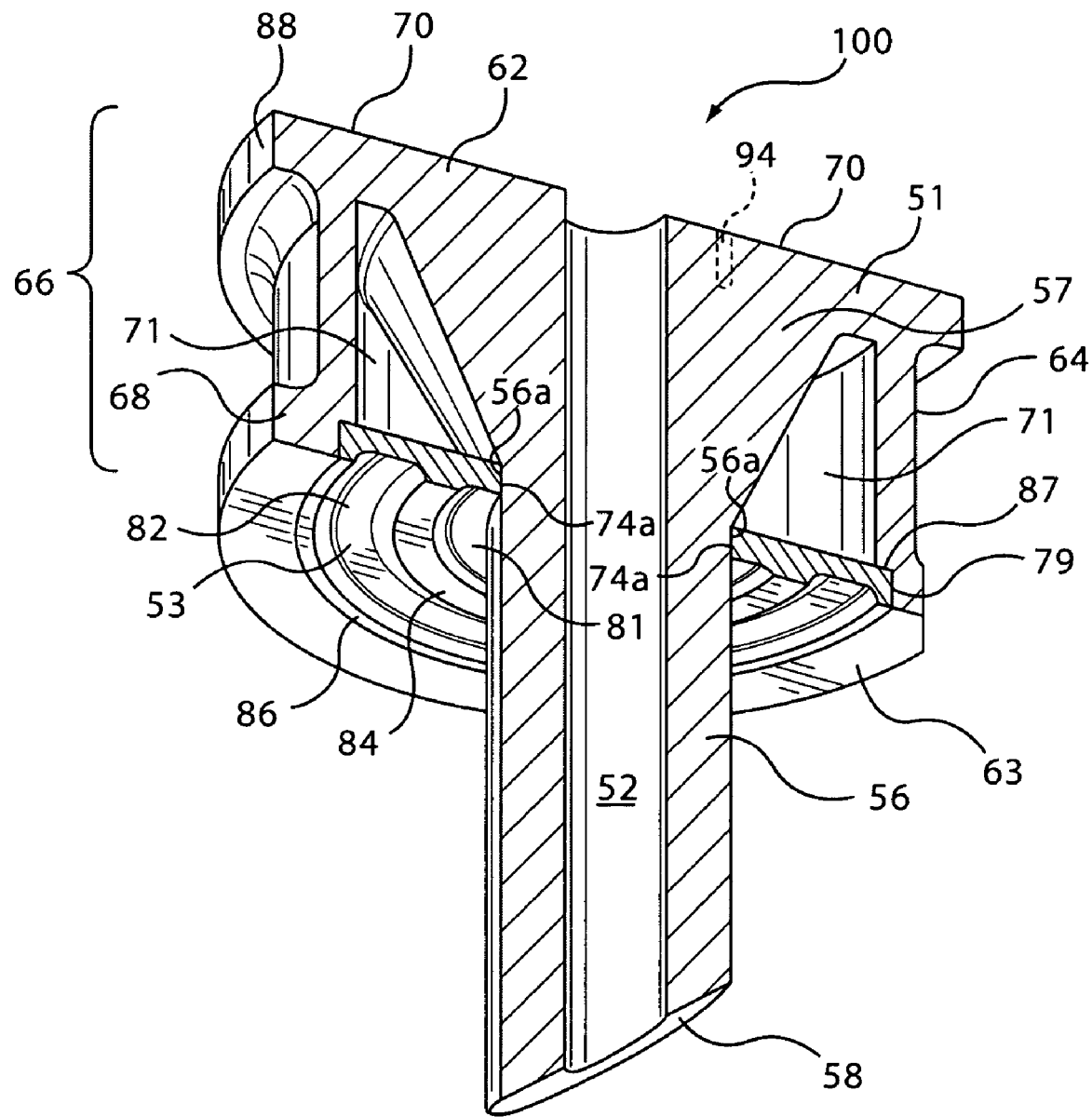
FIG. 8 is a perspective sectional view of a valve pin bushing according to a further embodiment of the invention.

FIG. 8 illustrates yet another embodiment of the present invention. In particular, FIG. 8 illustrates a valve pin bushing 100, which is similar to valve pin bushing 50 of FIGS. 2 and 3, except that valve pin bushing 100 lacks lip 74. Also, valve pin bushing 100 includes a first member 51 that includes the elements of valve pin bushing 50 (i.e., head portion 66 and tubular member 56) and a sealing portion 53 that forms an internal sealed hollow chamber 71. Sealing portion 53 is a substantially planar, circular disk that seals off the leading end of chamber 71. Sealing portion 53 includes a central opening 74a forming an inner edge having a circumference that sealingly engages an outer wall 56a of tubular member 56, and has an outer peripheral edge 79 that sealingly engages flange 64. A step 87 is provided around the inner edge of the forward end of flange 64 for receiving the outer edge 79 of the sealing portion 53.

In one embodiment, the sealing portion 53 is a pressure disk and includes spaced apart inner and outer grooves 81 and 82 facing the manifold 14. As best seen in FIG. 8, the grooves 81 and 82 are separated by a first ridge 84 that bears against the manifold 14. The outer groove 82 terminates at a second ridge 86 that also bears against the manifold 14. The inner groove 81 can function to catch melt escaping from around the manifold bore 42, which hardens as it gets further from the heat of the bore 42 and which is also prevented from going further by first ridge 84. The outer groove 82 acts to catch any melt passing first ridge 84, with the second ridge 86, together with shoulder 68, acting as a further seal against melt leakage. Grooves 81, 82 can also reduce heat transfer from the hot manifold to first member 51, and increase the resilience of the sealing portion 53 to resist breaking of the seal between the sealing portion 53 and first member 51. In various embodiments, more or less than two grooves 81, 82, are provided in the manifold facing surface of sealing portion 53, and in another embodiment, such surface is flat with no grooves provided therein. Further, in another embodiment, ridges 84 and 86 are replaced by seal rings of the type typically used in high temperature applications.

The surface 63 of flange 64 although in contact with sealing portion 53, does not increase the surface area of contact with manifold 14. Thus, valve pin bushing 100 operates in the same manner as valve pin bushing 50.

Further, as seen in FIG. 8, a peripheral lift edge 88 is provided around a back end 62 of valve pin bushing 100 to provide an edge for attaching a lift tool for inserting and removing valve pin bushing 100 from the injection molding apparatus 10. However, lift edge 88 may omitted or replaced with tapped holes 94 (shown in phantom in FIG. 8) provided through back plate contacting surface 70.

The sealing portion 53 may be formed from the same or different materials as the remainder of valve pin bushing 100. In an embodiment of the present invention where sealing portion 53 is formed from a different material, the materials may have different thermal and/or other physical characteristics. For example, first portion 51, including head portion 66 and tubular portion 56 through which valve pin 38 reciprocates, can be formed from a harder material to accommodate wear from valve pin 38, while sealing portion 53 may be formed from a more flexible material.

It will be appreciated that a vacuum space is generally a very good insulator. Thus, vacuum brazing may be used to join sealing portion 53 together with first portion 51, resulting in chamber 71 being a vacuum chamber. In a vacuum brazing process to form valve pin bushing 100, brazing alloy or material is pre-positioned, at the joints between sealing portion 53 and first portion 51 (i.e., where sealing portion 53 meets flange 64 and tubular portion 56), and the valve pin bushing 100 is placed in a brazing oven that is evacuated of air. A sufficient gap is left between sealing portion 53 and first portion 51 so that air can escape from the chamber 71 as the furnace is evacuated prior to sealing of the joint. Once the brazing furnace is evacuated sufficiently to result in a desired negative pressure within chamber 71, the furnace temperature is increased and the brazing material seals the joints between the sealing portion 53 and first portion 51. In various embodiments, sealing portion 53 may be joined to first member 51 by means other than vacuum brazing, such as by traditional brazing, welding, using adhesives or by another method apparent to one skilled in the art. In other various embodiments, the chamber 71 is not a vacuum chamber, but is filled with air, or other insulating material.

Figure 9:
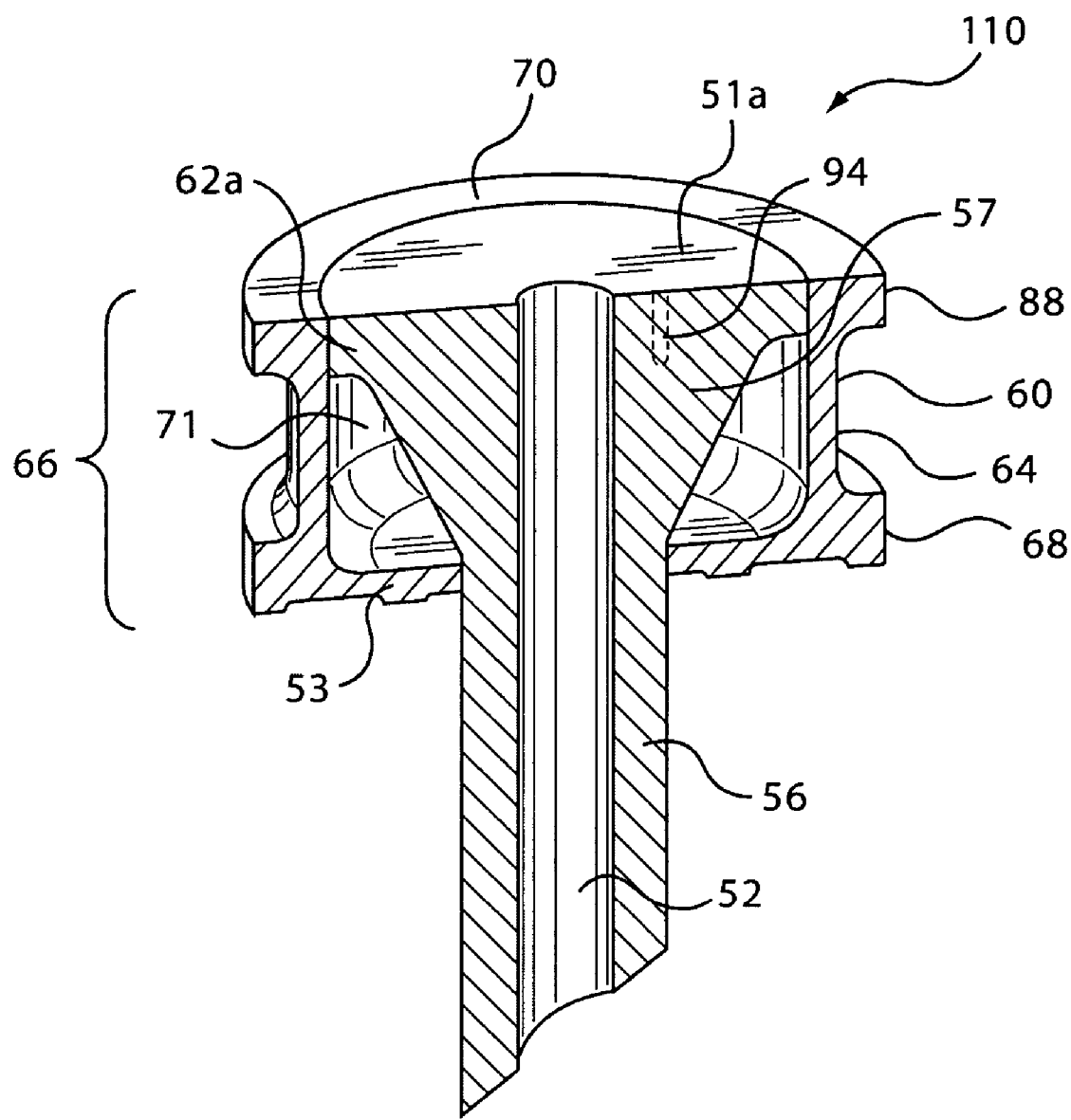
FIG. 9 is a perspective sectional view of a valve pin bushing according to a further embodiment of the invention.

FIG. 9 shows a valve pin bushing 110 according to another embodiment of the present invention. Valve pin bushing 110 is substantially similar in construction, function, and manufacture to valve pin bushing 100, with the exception of differences that will be apparent from the Figures and the following description. The valve pin bushing 110 is formed from a first member 51a and a second member 60 that collectively define internal vacuum chamber 71. However, unlike valve pin bushing 100, first member 51a includes only central portion 57 and tubular member 56. Thus, back end 62a is split between first member 51a and second member 60. In addition, the second member 60 integrally includes support flange 64, along with manifold engaging shoulder 68 and lift edge 88. As with valve pin bushing 100, the first and second members 51a and 60 may be formed from the same materials or formed from different materials. Further, first and second members 51a and 60 may be joined by methods similar to those described above for valve pin bushing 100, such as vacuum brazing. In yet another embodiment, sealing portion 53 may be an integral piece formed with tubular member 56 and central portion 57, such that flange 64 may be subsequently joined to back end 62a and sealing portion 53 using one of the methods discussed above with respect to FIG. 8 to form chamber 71, such as vacuum brazing.

As will be apparent to those skilled in the art in light of the foregoing disclosure, many alterations and modifications are possible in the practice of this invention without departing from the claimed scope thereof. Accordingly, the scope of the invention is to be construed in accordance with the substance defined by the following claims.

What is claimed is:

1. An injection molding apparatus, comprising:
 a heated manifold having a manifold surface and a valve pin bore;
 a back plate having a back plate surface disposed adjacent to and in parallel with said manifold surface; and a valve pin bushing disposed between said manifold and said back plate, said valve pin bushing including a head portion having a manifold contacting surface area, a back plate contacting surface area, a central portion, and a flange extending from a back end of said head portion, wherein an insertion member extends from said central portion in a direction opposite said back end of said head portion for positioning said valve pin bushing within said valve pin bore of said manifold; and wherein said back plate contacting surface area is larger than said manifold contacting surface area.

2. The injection molding apparatus of claim 1, wherein a first end of said central portion is closest to said flange near said back end of said head portion and a second end of said central portion is farthest from said flange near said manifold surface.

3. The injection molding apparatus of claim 2, wherein said central portion is tapered as it extends away from said back end of said head portion, such that an air space is defined by said flange, said central portion, and said manifold surface.

4. The injection molding apparatus of claim 3, wherein said central portion has a frusto-conical configuration.

5. The injection molding apparatus of claim 1, wherein said back end of said head portion has an outer surface parallel to but not contacting said manifold surface, and said central portion is spaced away from said flange, such that an air space is defined by said flange, said back end, said central portion and said manifold surface.

6. The injection molding apparatus of claim 1, wherein said flange is removable connected to said back end of said head portion.

7. The injection molding apparatus of claim 6, wherein said flange is connected to said back end of said head portion via a threaded connection.

8. The injection molding apparatus of claim 1, wherein said insertion portion includes a tubular member.

9. The injection molding apparatus of claim 8, wherein said tubular member has a leading surface that defines a portion of a melt channel when positioned within said manifold.

10. The injection molding apparatus of claim 8, wherein said valve pin bushing further includes a sealing portion having an outer edge connected to said flange and an inner edge connected to said tubular member, said sealing portion, said central portion and said flange defining a closed space.

11. The injection molding apparatus of claim 10, wherein said sealing portion is integral with said flange.

12. The injection molding apparatus of claim 10, wherein said sealing portion is integral with said tubular member.

13. The injection molding apparatus of claim 10, wherein air is withdrawn from said closed space to form a vacuum therein.

14. The injection molding apparatus of claim 10, wherein said closed space is filled with air.

15. The injection molding apparatus of claim 10, wherein a manifold-facing surface of said sealing portion includes at least one groove.

16. The injection molding apparatus of claim 1, wherein said back plate contacting surface area is circular.

17. The injection molding apparatus of claim 16, wherein said manifold contacting surface area is annular.

18. The injection molding apparatus of claim 1, wherein a plurality of the flanges extend from said head portion forming a plurality of manifold contacting surfaces.

19. The injection molding apparatus of claim 1, wherein said valve pin bushing further includes a lip extending from said central portion, wherein said lip includes a lip surface contacting said manifold surface.

20. The injection molding apparatus of claim 19, wherein said manifold contacting surface area and said lip surface have a combined surface area that is less than said back plate contacting surface area.

21. The injection molding apparatus of claim 1, wherein said back plate includes a cooling system.

22. The injection molding apparatus of claim 1, wherein said manifold includes a positioning pin which aligns with a positioning groove on said valve pin bushing.

23. A valve pin bushing, comprising:

a head portion including a back end, a flange and a central portion, said back end having a back plate contacting surface area and said flange having a manifold contacting surface area opposite said back plate contacting surface; and a tubular member extending from said central portion of said head portion in a direction opposite said back end of said head portion;

wherein said head portion and said tubular member define a channel through said valve pin bushing for a valve pin and wherein said back plate contacting surface area is larger than said manifold contacting surface area.

24. The valve pin bushing of claim 23, wherein a first end of said central portion is closest to said flange near said back end of said head portion and a second end of said central portion is farthest from said flange near said manifold contacting surface of said flange.

25. The valve pin bushing of claim 24, wherein said central portion is tapered as it extends away from said back end.

26. The valve pin bushing of claim 25, wherein said central portion has a frusto-conical configuration.

27. The valve pin bushing of claim 23, further comprising a lip extending from said central portion near said tubular member.

28. The valve pin bushing of claim 23, wherein a leading surface of said tubular member is angled.

29. The valve pin bushing of claim 23, wherein a leading surface of said tubular member is curved.

30. The valve pin bushing of claim 23, further comprising a sealing portion having an outer edge connected to said flange and an inner edge connected to said tubular member.

31. The valve pin bushing of claim 30, wherein said sealing portion, said flange and said central portion define an enclosed space.

32. The valve pin bushing of claim 31, wherein air is withdrawn from said enclosed space to form a vacuum therein.

* * * * *